United States Patent
Mizoguchi

(10) Patent No.: US 6,771,633 B1
(45) Date of Patent: Aug. 3, 2004

(54) MULTI-POINT COMMUNICATIONS SYSTEM AND METHOD THEREOF

(75) Inventor: Michiko Mizoguchi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 726 days.

(21) Appl. No.: 09/592,350

(22) Filed: Jun. 12, 2000

(30) Foreign Application Priority Data

Sep. 1, 1999 (JP) ............................................ 11-247906

(51) Int. Cl.$^7$ .............................................. H04Q 7/20
(52) U.S. Cl. ...................................... 370/345; 370/462
(58) Field of Search ................................ 370/310, 321, 370/328, 345, 347, 495, 501, 230, 338, 462, 524

(56) References Cited

U.S. PATENT DOCUMENTS

| | | | | |
|---|---|---|---|---|
| 5,577,043 A | * | 11/1996 | Guo et al. ................... | 370/449 |
| 5,745,695 A | * | 4/1998 | Gilchrist et al. ............ | 709/227 |
| 5,774,460 A | * | 6/1998 | Schiffel et al. ............. | 370/329 |
| 6,400,698 B1 | * | 6/2002 | Shaheen ..................... | 370/329 |
| 6,556,552 B1 | * | 4/2003 | Nakagomi et al. .......... | 370/332 |

FOREIGN PATENT DOCUMENTS

| | | |
|---|---|---|
| JP | 5-22321 | 1/1993 |
| JP | 7-288792 | 10/1995 |

* cited by examiner

*Primary Examiner*—Min Jung
(74) *Attorney, Agent, or Firm*—Katten Muchin; Zavis Rosenman

(57) ABSTRACT

If a mobile terminal A requests a call connection to a fixed terminal B which can accommodate a plurality of channels, connection is established between the fixed terminal B and mobile terminal A via one channel. If another slave terminal C requests a call connection to the fixed terminal B, a channel different from one used by the mobile terminal A is used. When establishing the connection to the mobile terminal C, the fixed terminal B issues to the mobile terminal A an instruction to temporarily stop transmitting/receiving information. This allows the mobile terminal to wait for a new instruction while holding its communication session. In this way, the connection between the fixed terminal B and mobile terminal C is established. By shifting the transmission source from the fixed terminal B to the mobile terminal A or C, information obtained by the mobile terminal A or C can be transmitted to the fixed terminal B or other mobile terminals.

12 Claims, 13 Drawing Sheets

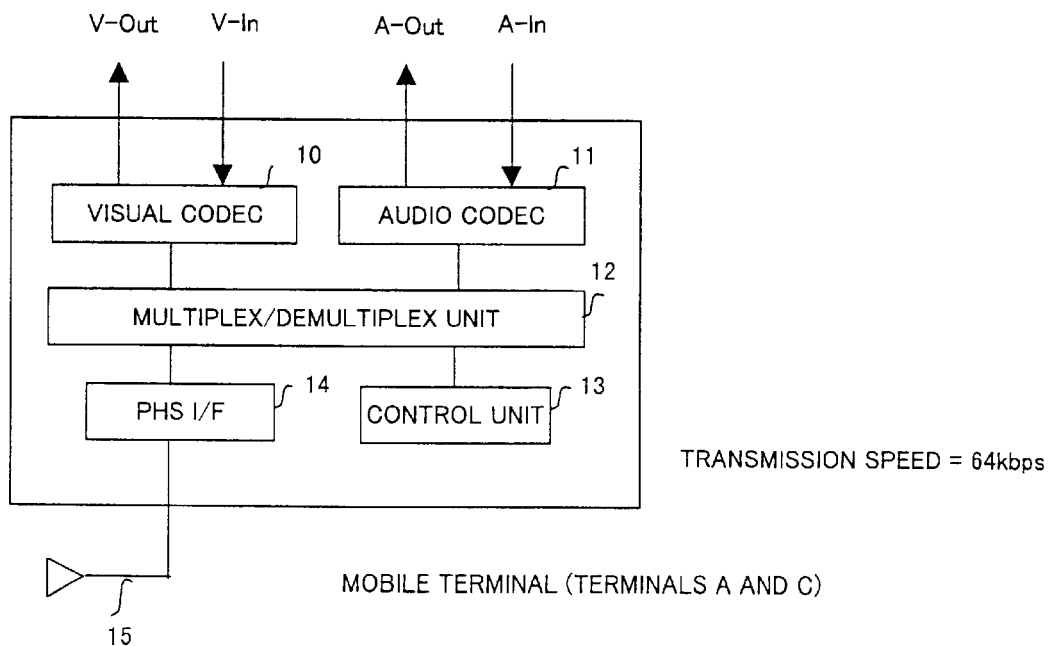
F I G. 4A
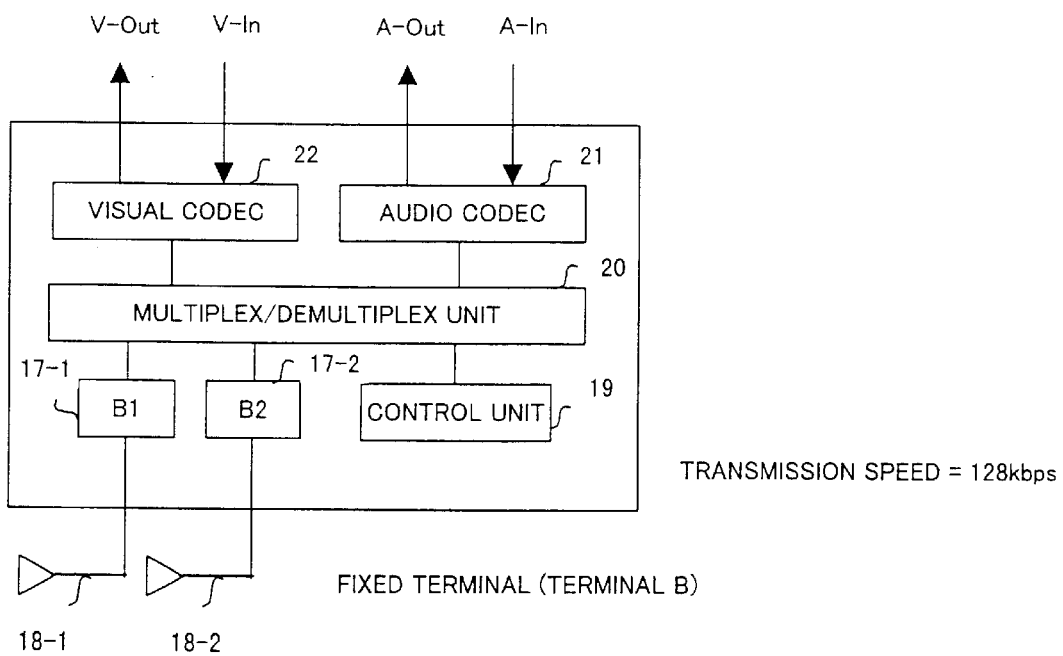
F I G. 4B

MULTI-POINT COMMUNICATIONS SYSTEM AND METHOD THEREOF

BACKGROUND OF THE INVENTION

1. Field of the Invention

The present invention relates to a multi-point mobile communications system.

2. Description of the Related Art

As the network environment has been diversified, a variety of visual communications equipment with a variety of transmission speeds and protocols corresponding to a variety of networks have been put to practical use. In particular, recently the need for visual communications by a mobile object has been increasing and it is required that visual communications using a radio network are implemented with a simple configuration and a low cost. The coverage of visual communications via a radio network has been expanded and the wide collection of pictures has become available. In the meantime, a center using pictures has a request for simultaneously receiving pictures from many types of mobile communications equipment. One application of such a visual communications system using a radio network is fire fighting. A fire-fighting communications system is configured to connect the front and back of a fire site, a fire station, etc., with one another, to receive information (image/voice) from an arbitrary point and to conduct prompt and efficient fire fighting.

FIG. 1 shows the concept of the application form of a visual communications system using a radio network.

A visual communications system using a radio network can also be applied to a construction communications system for connecting a construction site, a construction office, headquarters, etc., with one another and to receive information from an arbitrary point, in addition to the fire-fighting communications system. In this case, information can be transmitted from the construction site to the construction office and vice versa, and thereby the construction site can be effectively supervised by the construction office.

In conventional visual transmission over a radio network, one-directional transmission from mobile equipment to a fixed station was common and one-to-one communications were conducted. Multi-point communications in visual transmission using a fixed network, such as ISDN (Integrated Services Digital Network), etc., generally requires an expensive dedicated device for connecting and controlling a plurality of points, called a multi-point conference device.

Mobile communications use a radio network. A radio network has a transmission band narrower than a fixed network. Under such an environment, information (image/voice) must be transmitted among a plurality of points. Terminals for mobile communications must be able to be used in a variety of places and must be inexpensive. An entire system must also be inexpensive. In these situations, an expensive multi-point visual communications system using a radio network must be configured without using a dedicated device, such as a multi-point conference device.

SUMMARY OF THE INVENTION

An object of the present invention is to provide a multi-point mobile communications system for communicating among a plurality of terminals used in peer-to-peer.

The multi-point communications system of the present invention comprises at least two terminal units for acquiring information, transmitting over a radio network and temporarily stopping transmitting/receiving information while holding a communications session, if required, and a received information interpreting unit which accomodates more channels than the number of terminal units but fewer than the channels to be accomodated. The multi-point communications system further comprises a main terminal unit for temporarily stopping transmitting/receiving information while allowing the terminal unit currently connected to hold a communication session and connecting the terminal unit which requests a new connection to the network, if there is a new connection request from one terminal not yet connected to the network of the at least two terminal units while the other terminal unit of the at least two terminal units is connected to the network.

The multi-point communications method of the present invention implements multi-point communications between at least two terminal units for acquiring information, transmitting over a radio network and temporarily stopping transmitting/receiving information while holding a communications session, if required via a master terminal unit with a received information interpreting unit which accomodates more channels than the number of terminal units but fewer than the channels to be accomodated, and comprises the steps of temporarily stopping transmitting/receiving information while allowing the terminal unit currently connected to hold a communications session and connecting the terminal unit which requests a new connection to the network, if there is a new connection request from one terminal not yet connected to the network of the at least two terminal units while the other terminal unit of the at least two terminal units is connected to the network.

According to the present invention, multi-point communications can be conducted using a simple and inexpensive device. In particular, although a conventional TV conference system uses a network connected by wired lines, the present invention can use a network with a band narrower than a wired network, such as a radio network. Although in the conventional TV conference system, a master server (master terminal) was provided with the same number of codecs as channels, in the present invention, multi-point communications can be conducted with fewer information reception interpreting devices than the number of channels, for example, with codecs, or a master terminal provided with only one information reception interpreting device. Therefore, there is no need to provide many expensive information reception interpreting devices, and a system with an inexpensive and simple configuration is available. By using a radio network, the mobility of a terminal can be improved and thereby a variety of information can be acquired from a variety of sites.

BRIEF DESCRIPTIONS OF THE DRAWINGS

FIGS. 4A and 4B show the main functional configurations of terminals in this preferred embodiment of the present invention.

DESCRIPTION OF THE PREFERRED EMBODIMENTS

Figure 1:
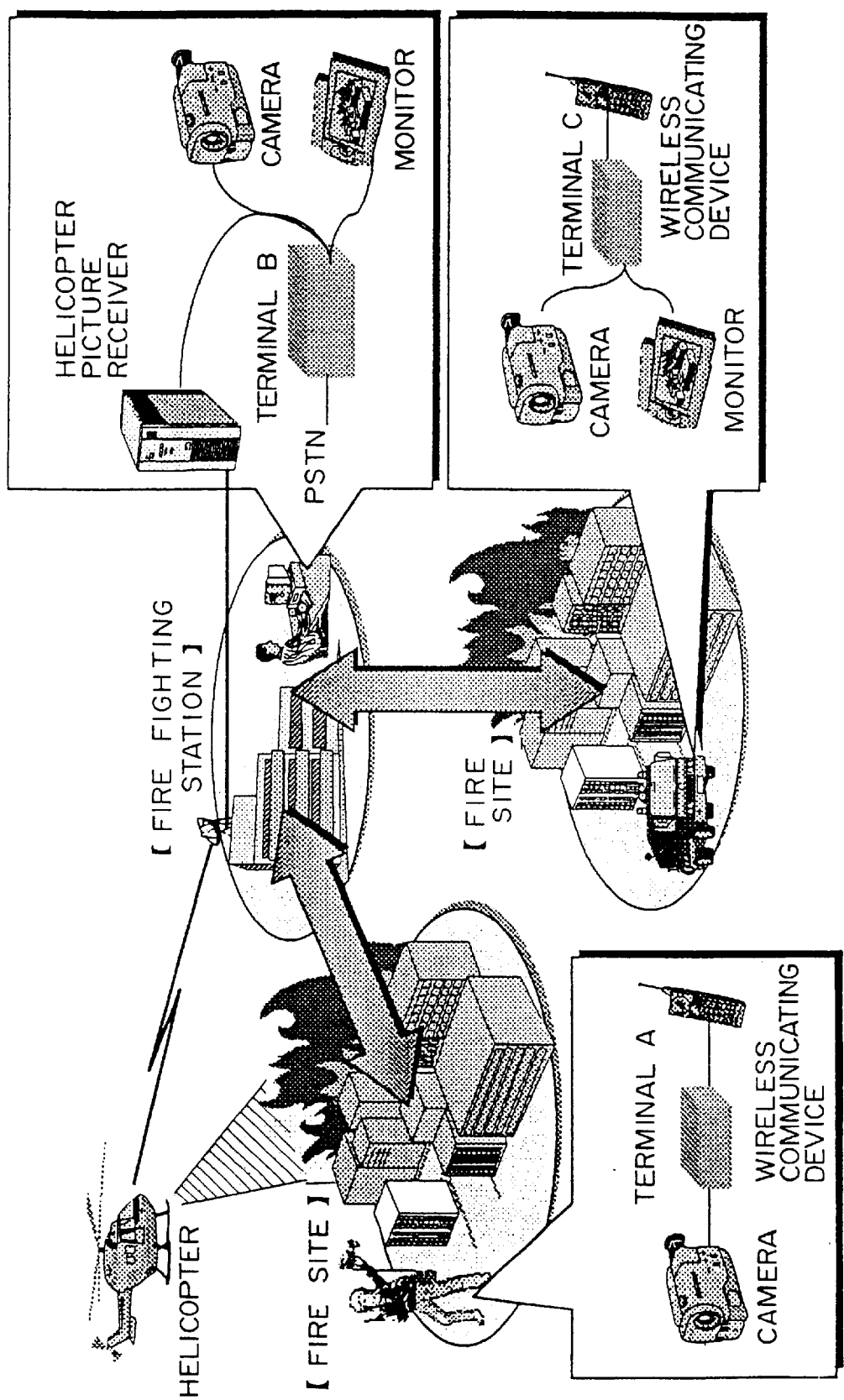
FIG. 1 shows the concept of the application form of a visual communications system using a radio network.
Figure 2:
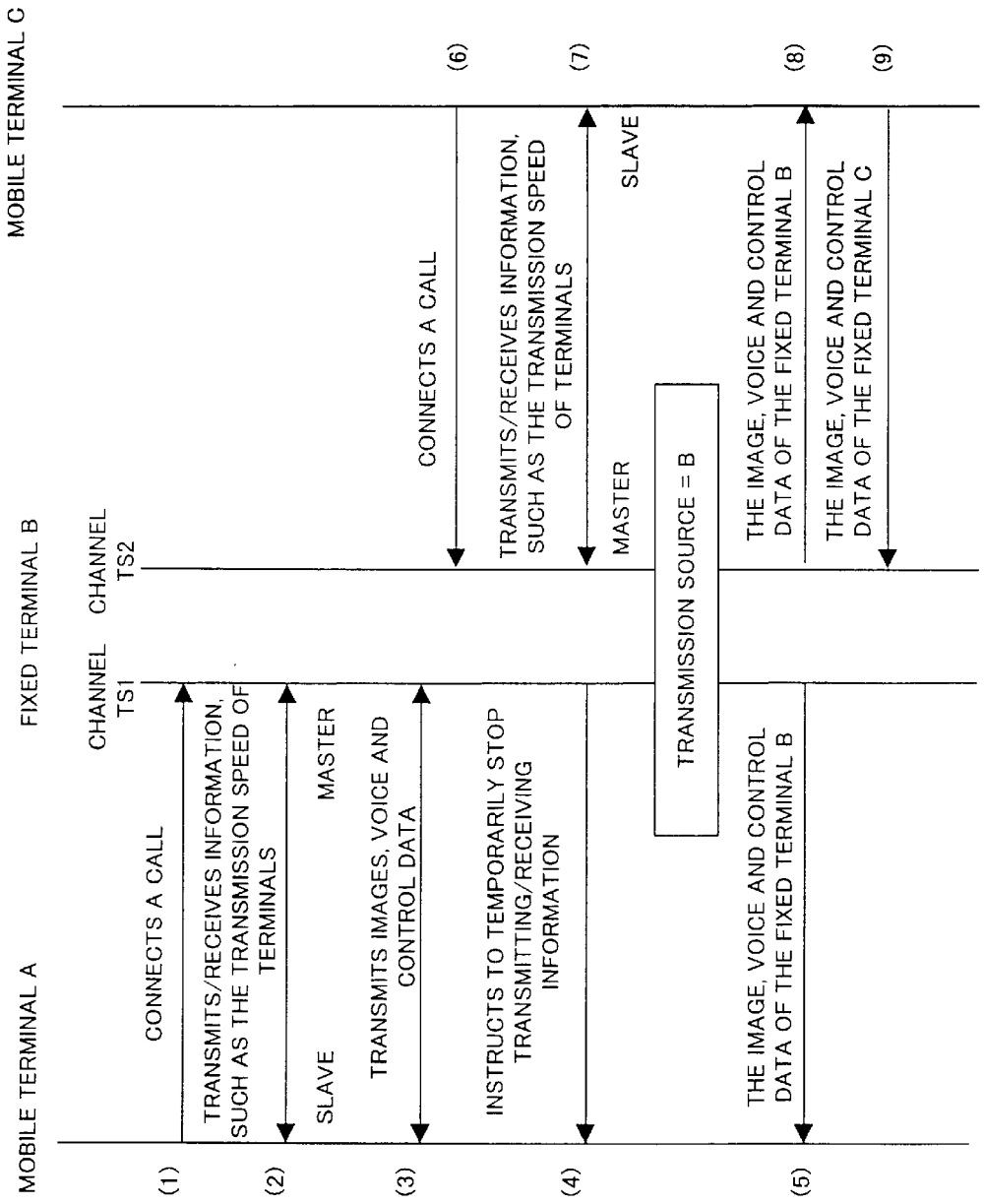
FIG. 2 is a sequence diagram showing the visual communications connection process of one preferred embodiment of the present invention.

FIG. 2 is a sequence diagram showing the visual communications connection process of one preferred embodiment of the present invention.

If a mobile terminal and a fixed terminal are compared, the line capacity of the fixed terminal is generally higher than that of the mobile terminal. In the current public mobile radio communications, 32 kbps of the PHS (Personal Handy-phone System), which is expected to be soon expanded to 64 kbps, is a maximum. It is easy to connect a PHS terminal with a fixed terminal having an ISDN interface. If a fixed terminal is interfaced at 128 kbps (2B+D), the fixed terminal can communicate at least two sets of mobile terminals at one time based on the line capacity.

First, it is assumed that there is a call connection request from a mobile terminal A to a fixed terminal B (1). In this case, information necessary for a call connection, such as transmission speed, etc., is transmitted/received between the mobile terminal A and the fixed terminal B (2). The mobile terminal A and fixed terminal B are normally connected peer-to-peer and images, voice and control signals are transmitted/received between them (3). At this time, the fixed terminal B is connected using a channel 1 out of two channels (2B). The fixed terminal B transmits/receives images, voice and control data to/from the mobile terminal A. Since the mobile terminal A has only a line capacity of one channel, a normal connection is made. In this case, the fixed terminal having capacity in the number of accommodated lines and the mobile terminal A are set as a master and a slave, respectively.

Then, it is assumed that there is a call connection request from a mobile terminal C to the fixed terminal B (6). In this case, information necessary for a call connection, such as transmission speed, etc., is transmitted/received between the mobile terminal C and the fixed terminal B (7), and the mobile terminal C and fixed terminal B are connected. The fixed terminal B is connected to the mobile terminal C using a channel 2. In this case, the fixed terminal B with a higher line capacity and the mobile terminal C are set as a master and a slave, respectively. When being connected to the second terminal in the network, the fixed terminal B issues an instruction to temporarily stop the transmission/reception of information to the mobile terminal A (4). Then, the first transmission/reception of information is performed between the fixed terminal B and mobile terminal C.

The following processes are performed in such a way that information can be transmitted/received among a plurality of mobile terminals and a single fixed terminal, the information of a specific site can be simultaneously received at a center and other sites, and the information of the center can be simultaneously received at a plurality of sites.

Specifically, after issuing an instruction to temporarily stop transmitting/receiving information to the mobile terminal A, the fixed terminal B sets the transmission source of images and voice to the fixed terminal B, and images, voice or control signals are transmitted from the fixed terminal B to the mobile terminals A and C (5 and 8). The fixed terminal B also receives images, voice and control signals from the mobile terminal C (9).

In this way, visual data and voice data which the mobile terminal C receives can be obtained not only at the fixed terminal B but also at the mobile terminal A by the fixed terminal B transmitting the images and voice which are received from the terminal C to both mobile terminals A and C.

Figure 3:
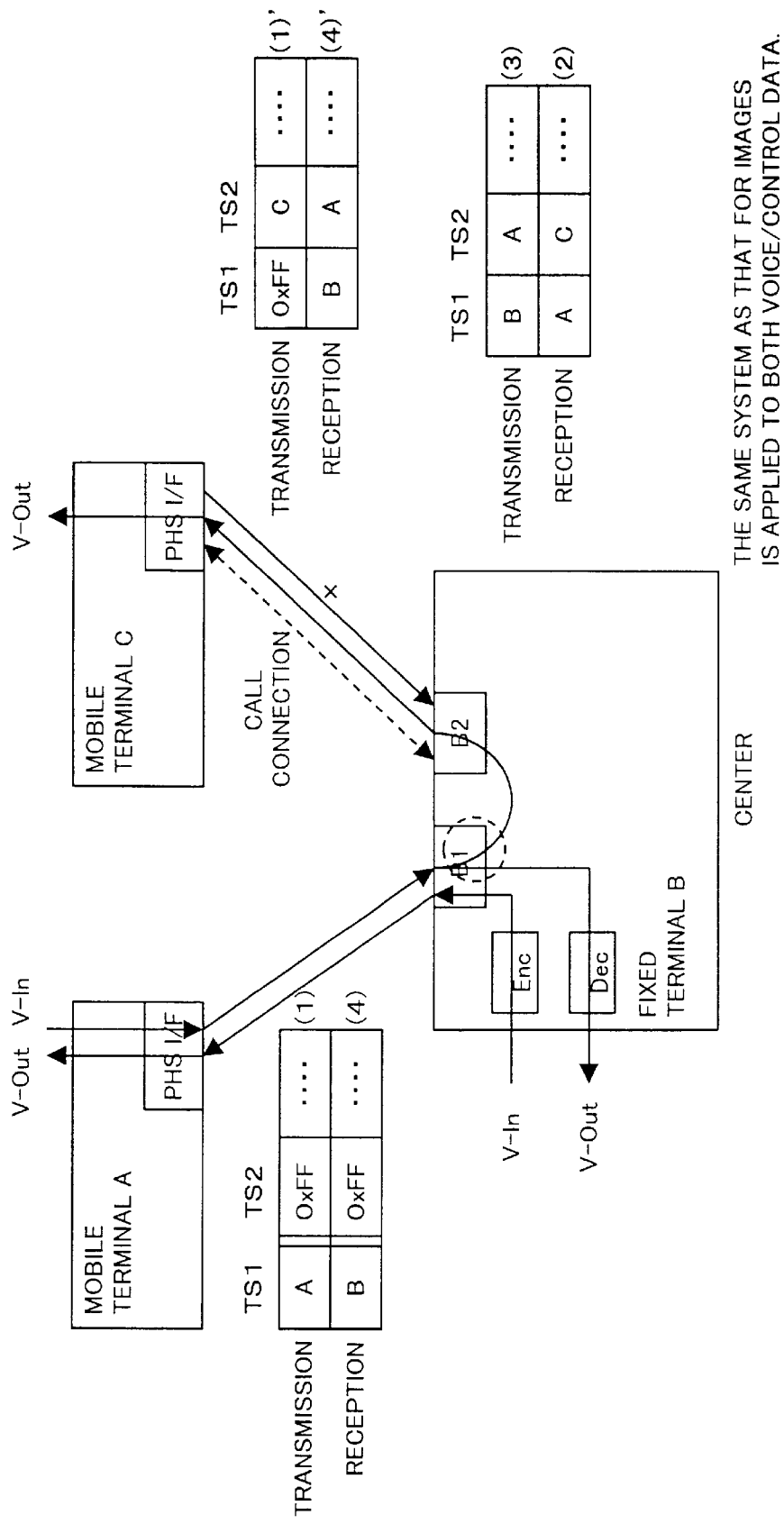
FIG. 3 shows the system configuration of this preferred embodiment.

FIG. 3 shows the system configuration of this preferred embodiment.

Although the fixed terminal B is connected with two mobile terminals (A and C) in the network, it is not preferable to provide each of the lines with an interpreter for images, voice and control data, since the interpreter is expensive. Since in an ordinary peer-to-peer connection, only a single interpreter is used, in this preferred embodiment, it is assumed that only a single interpreter for images, voice and control data is used. Images are assumed to be compressed and transmitted in a narrow band of approximately 32 kbps to 128 kbps.

For an animation compression algorithm, compression by both DCT (Discrete Cosine Transform) and inter-frame difference, such as H.261/263 compression is popular. Since according to this algorithm, an inter-frame difference is transmitted, it is necessary to store the same data on both the transmitting and receiving sides, and the transmission source of images to be received cannot be easily. switched over between the mobile terminals A and C. Therefore, if the transmission source is switched over from the mobile terminal A to the mobile terminal C, the final image is stored in the display memory of the fixed terminal B and the image is frozen until the fixed terminal B receives the next set of visual data from the mobile terminal C. After being released from the transmission source, the mobile terminal A performs intra-frame compression and prepares for the next transmission. After the fixed terminal B issues a transmit instruction to the mobile terminal C, and the mobile terminal C transmits visual data generated by inter-frame compression, images are transmitted using compression by normal inter-frame difference. The images, voice and control data of the mobile terminal C are transmitted to the mobile terminal A simply by transferring the information in the receiving channel to the transmitting channel of the fixed terminal B. At the same time, the images and voice of the fixed terminal B can be simultaneously received at both the mobile terminals A and C by simultaneously putting the images and voice in both the transmitting channels 1 and 2. Similarly, the images, voice and control data from the mobile terminal A are transmitted to the mobile terminal C as follows. As shown in FIG. 3, first, the fixed terminal B receives images, voice and control data from the mobile terminal A via channel 1 (1). At this time, the fixed terminal B receives images, voice and control data from the mobile terminal C via channel 2 (1)'. The fixed terminal B issues an instruction to temporarily stop transmitting/receiving information to the mobile terminal C. By this instruction, the mobile terminal C waits until the transmission/reception of information with the fixed terminal B is re-started while the mobile terminal C holds the communication session. The fixed terminal B transfers its own images, voice and control data and the images, voice and control data of the mobile terminal A to channels 1 and 2, respectively, and transmits the data to the mobile terminal C (3). Therefore, the mobile terminal C receives the images, voice and control data from the fixed terminal B at channel 1 and receives the images, voice and control data from the mobile terminal A at channel 2 (4)'. The input V-In from the fixed terminal B is encoded, is put in channel 1 and is transmitted. At this time, no signal is inputted to channel 2 (4). Furthermore, on receipt of the images, voice and control data from the mobile terminal A, the fixed terminal B decodes and reproduces the data.

In this preferred embodiment, a terminal number is assigned to each terminal when each terminal is connected. In this case, terminal types, which are generally used to determine a master and slaves, are determined based on the line capacity, and a terminal with high-class capability is provided with a right to determine a communication session, as a master terminal. The assignment of terminal numbers is performed by a master terminal. In FIG. 3, the fixed terminal B becomes a master. The transmission source of images and voice issues a transmit instruction and a stop instruction to other terminals using this terminal number as a key. If the mobile terminal A is a transmission source, the mobile terminal A controls the fixed terminal B and mobile terminal C. In this case, if the mobile terminal A receives an instruction from the mobile terminal C, a request (transmission source request, etc.) is issued to the mobile terminal A by the mobile terminal C. However, if the mobile terminal C receives data from the fixed terminal B, the mobile terminal C has no request path. In order to prevent this from occurring, the master terminal B secures a request path for all terminals by periodically switching a transmitting terminal. When the fixed terminal B makes a request, the fixed terminal B stops relaying signals to both the mobile terminals A and C, and transmits the signals of the fixed terminal B to both the mobile terminals A and C. While the fixed terminal B is the transmission source, the fixed terminal B receives and interprets the signals from both the mobile terminals A and C by time-division. The source (transmission source) of images/voice is selected in such a sequence.

A master terminal which exercises overall control is defined for each session, and the transmission source of information is controlled around a master terminal. Thus, each terminal can receive the information of an arbitrary point.

A terminal which establishes ordinary peer-to-peer communications always transmits/receives information. For example, there is a case where there is an error in received data and a re-transmission is necessary. Specifically, there is a case where control data cannot be temporarily transmitted (a request to a transmission source terminal cannot be accepted). If there is an error in received data while a transmission stop instruction is received from a master terminal, the display screen is frozen and audio is muted while the call is held, a request for new data is made when the next transmit instruction is received.

Since control information can be interpreted at the transmission source of information by only one communication party, a path switching method of control information is adopted. Even if the control information is issued in real time and if the control information is temporarily interrupted, communications can be held and information can be transmitted/received among a plurality of points by providing a mechanism to hold a state.

FIGS. 4A and 4B show the main functional configurations of terminals in this preferred embodiment of the present invention.

FIG. 4 shows the configuration for the mobile terminals A and C. A mobile terminal receives radio waves at an antenna 15 and the received waves are detected by a PHS interface 14. Then, the audio data, visual data and control data are separated in a multiplex/demultiplex unit 12. The control data separated in the multiplex/demultiplex unit 12 are transmitted to a control unit 13 and are used to control communications, etc. The audio data are transmitted to an audio codec 11, and the voice is reproduced and outputted as an audio output A-Out. The visual data are transmitted to a visual codec 10, and the images are produced and outputted as a visual output V-Out.

A visual input V-In and an audio input A-In are encoded in the visual codec 10 and audio codec 11, respectively, are multiplexed to encoded control data in the multiplex/demultiplex unit 12 and are transmitted via both the PHS interface 14 and antenna 15.

FIG. 4B shows the configuration of the fixed terminal B. The fixed terminal B is provided with the same number of channel connection units 17-1 and 17-2 as the number of channels, and the channel connection unit detects the signals of each channel received at the antennae 18-1 and 18-2. Then, the detected signals are transmitted to a multiplex/demultiplex unit 20, and are demultiplexed into the visual data, audio data and control data of each channel. The control data are used to control communications, etc., in a control unit 19. The visual data are inputted to a visual codec 22, are decoded and are outputted as a visual output V-Out. The audio data are inputted to an audio codec 21, are decoded and are outputted as an audio output A-Out.

A visual input V-In and an audio input A-In are inputted to the visual codec 22 and audio codec 21, respectively, are encoded and are inputted to the multiplex/demultiplex unit 20. The visual data, audio data and control data are multiplexed in the multiplex/demultiplex unit 20, are modulated by the channel connection units 17-1 and 17-2 and are transmitted from the antennae 18-1 and 18-2.

Figure 5:
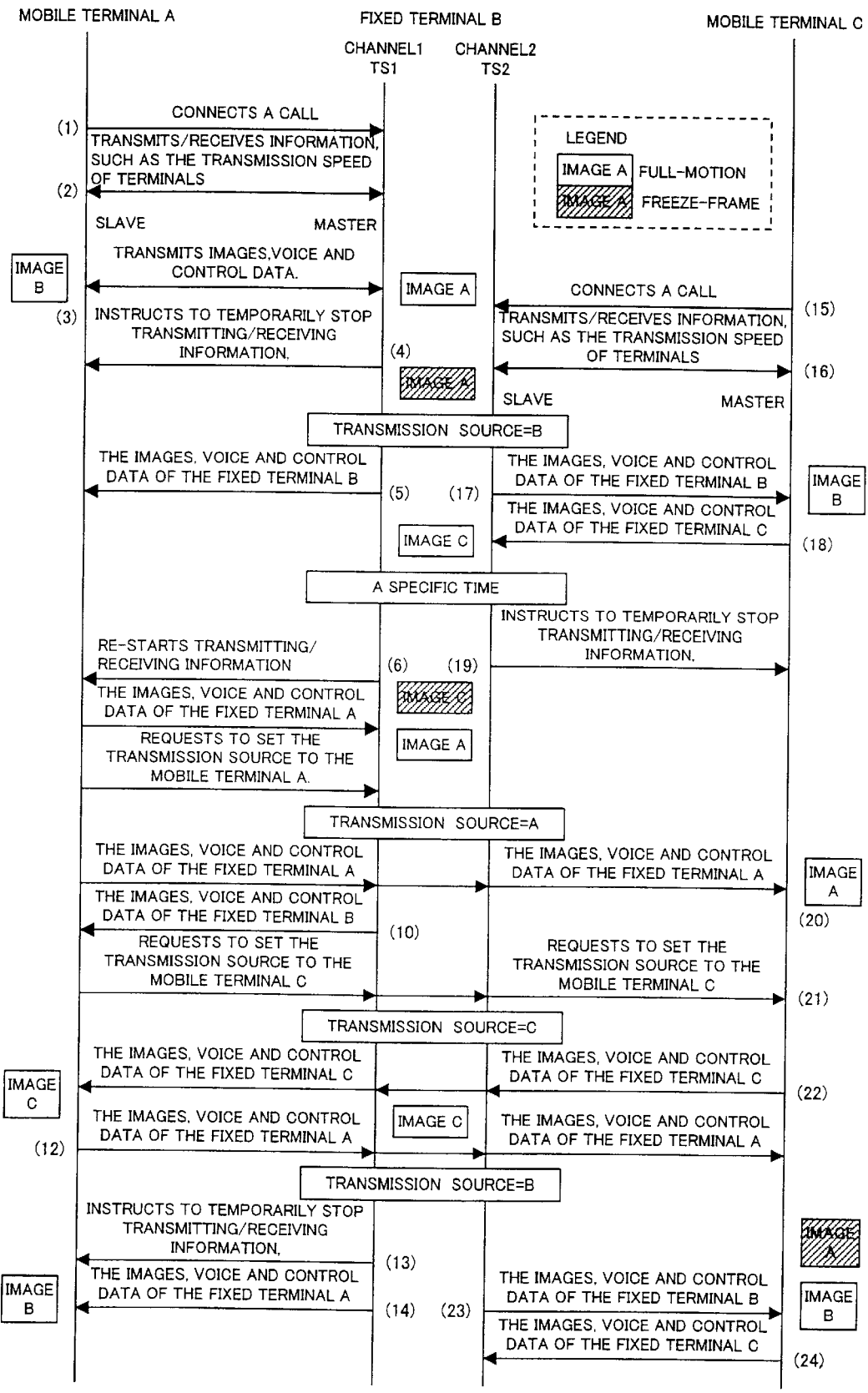
FIG. 5 is a sequence diagram showing the operation of one preferred embodiment of the present invention.

FIG. 5 is a sequence diagram showing the operation of one preferred embodiment of the present invention.

First, if there is a call connection request from the mobile terminal A to the fixed terminal B (1), information, such as transmission speed, etc., is transmitted/received between the terminals (2), and the mobile terminal A and fixed terminal B are connected. The same procedures as in an ordinary video telephone (H.324), etc., are taken except that the transmission speed of a terminal is used as a parameter when a relationship between a master and slaves is established. In this example, since the fixed terminal B is superior in transmission speed to the mobile terminal A, the fixed terminal becomes a master. Thus, images, voice and control data are communicated between the mobile terminal A and fixed terminal B (3).

Then, if a call connection request is transmitted from the mobile terminal C to the fixed terminal B (15), information needed for call connection, such as terminal information, etc., are transmitted/received (16), and the fixed terminal B and mobile terminal C are connected. Since the fixed terminal has only one system consisting of a multiplex unit, a visual codec and an audio codec, the transmission/reception of information between the fixed terminal B and mobile terminal A must be temporarily stopped so that information can be transmitted/received between the fixed terminal B and mobile terminal C. If information from the mobile terminal A is one-sidedly discarded by the fixed terminal B and if the mobile terminal A waits for a response, there is a possibility that communications may be terminated by the mobile terminal A. Therefore, an instruction to temporarily stop the session is issued from the fixed terminal B to the mobile terminal A (4). Information is transmitted/received between the fixed terminal B and a newly connected mobile terminal C. At this time, the fixed terminal B and mobile terminal C are set as a master and a slave, respectively. Then, the fixed terminal B starts transmitting the same information to channels 1 and 2 (5 and 17). Then, if there are the images, voice and control data from the mobile terminal C, the images transmitted from the mobile terminal C are displayed at the fixed terminal B.

Since in this example, the fixed terminal B controls the entire system, the information of the mobile terminal A is also periodically decoded by this switching. Specifically, the fixed terminal B freezes and displays the images of the mobile terminal C (displays the images in half-tone dot mesh) and simultaneously issues an instruction to re-start the transmission/reception of information to the mobile terminal A (6). Then, the images, voice and control data from the mobile terminal A are reproduced at the fixed terminal B (7). At this time, the mobile terminal A transmits a request to set the transmission source to its own terminal to the fixed terminal B (8). Then, the transmission source is set to the mobile terminal A, the images, voice and control data transmitted from the mobile terminal A (9) are transmitted to the mobile terminal C via the fixed terminal B and the images of the mobile terminal A can be displayed at the mobile terminal C (20). The images, voice and control data transmitted from the fixed terminal B are also reproduced at the mobile terminal A (10). The fixed terminal B can transmit control information in an arbitrary timing. If the transmission source sets its own terminal or another terminal as the transmission source, the fixed terminal B replaces data between the channels in addition to the switching control. Dotted arrows between the channels 1 and 2 of the fixed terminal indicate the replacement of this piece of data. If the mobile terminal A is the transmission source, the information in the receiving time slot 1 of the fixed terminal B is transferred to the transmitting time slot 2 without modification. The same data are also decoded at the initiating terminal and the images and voice are reproduced.

In order to display the images of the mobile terminal C at the mobile terminal A, a request to set the mobile terminal C as the transmission source is transmitted from the mobile terminal A to the fixed terminal B (11). This request is transferred to the mobile terminal C (21) and the transmission source is set to the mobile terminal C. This time, images, voice and control data are transmitted from the mobile terminal C (22), and the images, voice and control data of the mobile terminal C are reproduced at both the fixed terminal B and mobile terminal A. The images, voice and control data transmitted from the mobile terminal A (12) are also reproduced at both the fixed terminal B and mobile terminal C.

In order to return to the original state, the fixed terminal B sets its own terminal as the transmission source, issues an instruction to temporarily stop the transmission/reception of information to the mobile terminal A (13) and transmits the images, voice and control data from the fixed terminal B to both mobile terminals A and C (14 and 23). At this time, the mobile terminal C displays the images from the mobile terminal A in half-tone dot mesh and waits for the transmission of the images from the fixed terminal B. At this time, the images, voice and control data are transmitted from the mobile terminal C to the fixed terminal B (24).

Figure 6:
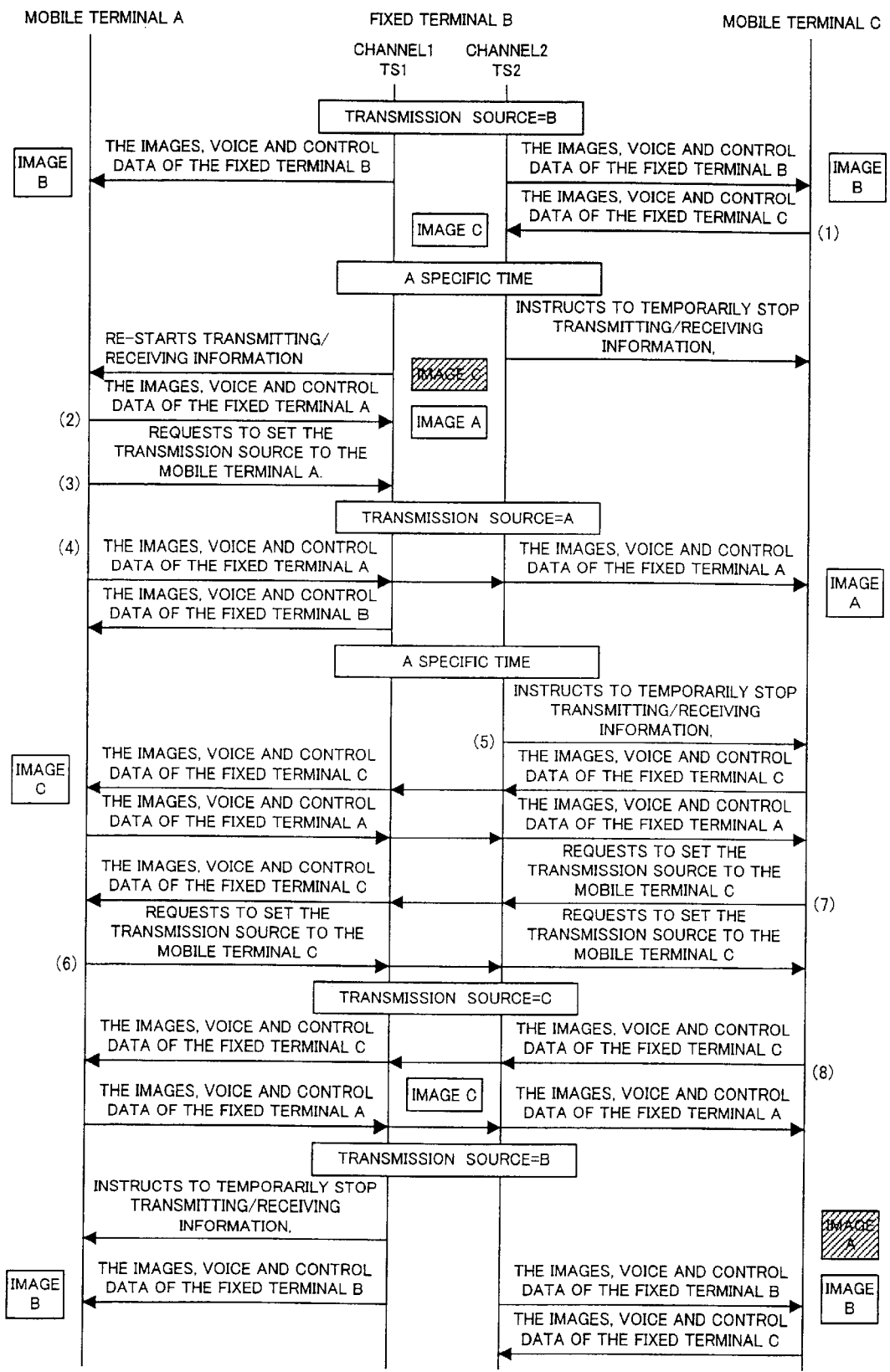
FIG. 6 is a sequence diagram showing the process of establishing the request path of each terminal.

FIG. 6 is a sequence diagram showing the process of establishing the request path of each terminal.

The master terminal B periodically switches a transmitting terminal and secures the request paths of all terminals. Although first, the fixed terminal B interprets the information of the mobile terminal C (1), the fixed terminal B interprets the information of the mobile terminal A after a specific time elapses (2). When a request to set the mobile terminal A as the transmission source is transmitted from the mobile terminal A to the fixed terminal B (3), the mobile terminal A is set as the transmission source. Then, the images, voice and control data from the mobile terminal A are transmitted to the mobile terminal C via the fixed terminal B (4). If the transmission source terminal is the mobile terminal A and the mobile terminal receives information from the fixed terminal B, information to be received by the mobile terminal A is transferred from the fixed terminal B to the mobile terminal C after a specific time has elapsed. Specifically, the fixed terminal B issues an instruction to re-start the transmission/reception of information to the mobile terminal C (5) after a specific time has elapsed. Then, the fixed terminal B spontaneously transmits the images, voice and control data from the mobile terminal C to the mobile terminal A. As a result, the images of the mobile terminal A and the images of the mobile terminal C can be displayed at the mobile terminals C and A, respectively. In this way, all terminals can issue a control request by time division by switching the transmission source at specific time intervals.

In order for the mobile terminal C to spontaneously set its own terminal as a transmission source, a transmission source request is transmitted from the mobile terminal C to the fixed terminal B (7). In this way, the images, voice and control data of the mobile terminal C are transmitted to the mobile terminal A. In order for the mobile terminal A to spontaneously display the images of the mobile terminal C, a request to set the mobile terminal C as the transmission source is transmitted from the mobile terminal A to the mobile terminal C via the fixed terminal B (6). As described above, the transmission source is set to the mobile terminal C, the image, voice and control data of the mobile terminal C are transmitted to the mobile terminal A, and simultaneously the images of the mobile terminal C are also displayed at the fixed terminal B. At this time, the images, voice and control data of the mobile terminal A are transmitted to the mobile terminal C.

If the fixed terminal B becomes the transmission source, an instruction to temporarily stop transmitting/receiving information is issued to the mobile terminal A, and images, voice and control data are transmitted from the fixed terminal B to both the mobile terminals A and C (9). At this time, the images of the mobile terminal A are displayed in freeze-frame at the mobile terminal C until the information of the fixed terminal B is transmitted. The mobile terminal C also transmits the images, voice and control data of its own terminal to the fixed terminal B.

Figure 7:
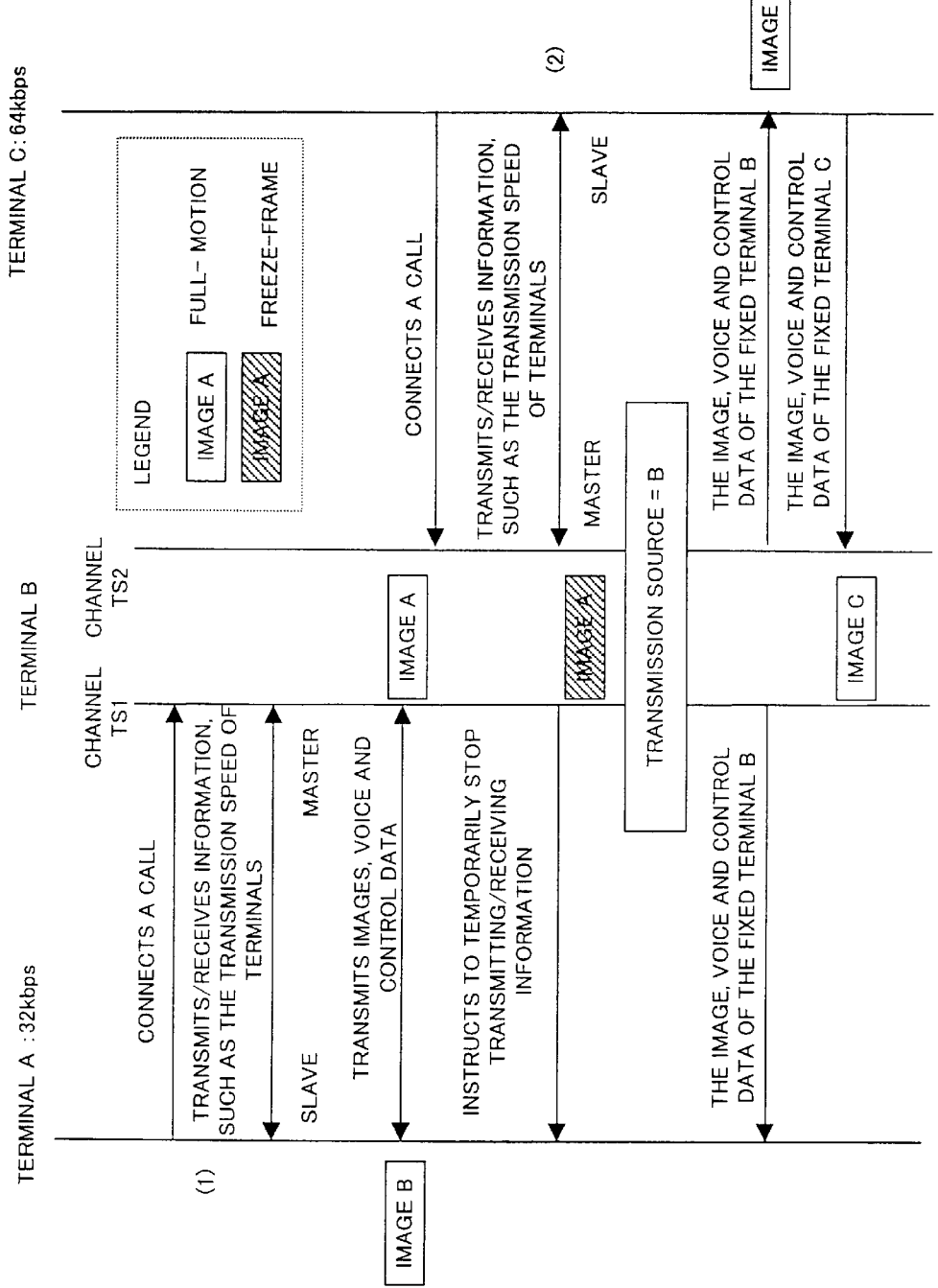
FIG. 7 is a sequence diagram showing a process in the case where a mobile terminal A has a different transmission speed from a mobile terminal C.

FIG. 7 is a sequence diagram showing a process in the case where the mobile terminal A is different in transmission speed from the mobile terminal C.

The mobile terminal A transmits/receives information within the range of the transmission speed of the mobile terminal A. In FIG. 7, 32 kbps (the four high-order bits of TS1) is used. Information is transmitted between the fixed terminal B and mobile terminal C at 64 kbps (the eight bits of TS2). The quality of transmission implemented in the connection of the fixed terminal B is not degraded.

It is assumed here that the mobile terminal A, fixed terminal B and mobile terminal C have the transmission capability of 64 kbps, 128 kbps and 32 kbps, respectively. In this case, communications are conducted between the mobile terminal A and fixed terminal B using one time slot for 64 kbps. First, a call connection request is transmitted from the mobile terminal A to the fixed terminal B, and communications are conducted with the fixed terminal B and mobile terminal A set as a master and a slave, respectively (1). Then, if the mobile terminal C is connected to the fixed terminal B (2), half of the time slot (for example, four bits out of eight bits) of the data from the mobile terminal A are valid. In this case, if data are transmitted from the mobile terminal A to the mobile terminal C, the transmission speed must be modified at the fixed terminal B. Since the encoding unit of the fixed terminal B is used for this speed modification, the data are transmitted in the data width receivable at the mobile terminal C and at the transmission speed of the mobile terminal A according to the instruction of the fixed terminal B issued when the low-speed terminal joins in. Data which are received only by the master terminal can be transmitted at the highest speed of the transmitting terminal, which prevents the quality of the received data of the master terminal from degrading to the equivalent of the lowest speed. If data are transmitted from the mobile terminal C, the entire time slot is used. For example, in the case of an 8bit time slot, all eight bits are used. In this case, if signals from the mobile terminal C are transmitted to the mobile terminal A, speed modification is made by the fixed terminal B.

As described above, the appropriate quality of information can be maintained by a method of dynamically designating the transmitting channel width of information at the master terminal, which performs overall control.

Although a case where there are two mobile terminals has been described above, a far grater number of mobile terminals can also be accommodated. In this case, the fixed terminal B, which becomes a master, accesses each mobile terminal by time division and sequentially acquires information from the mobile terminal.

Figure 8:
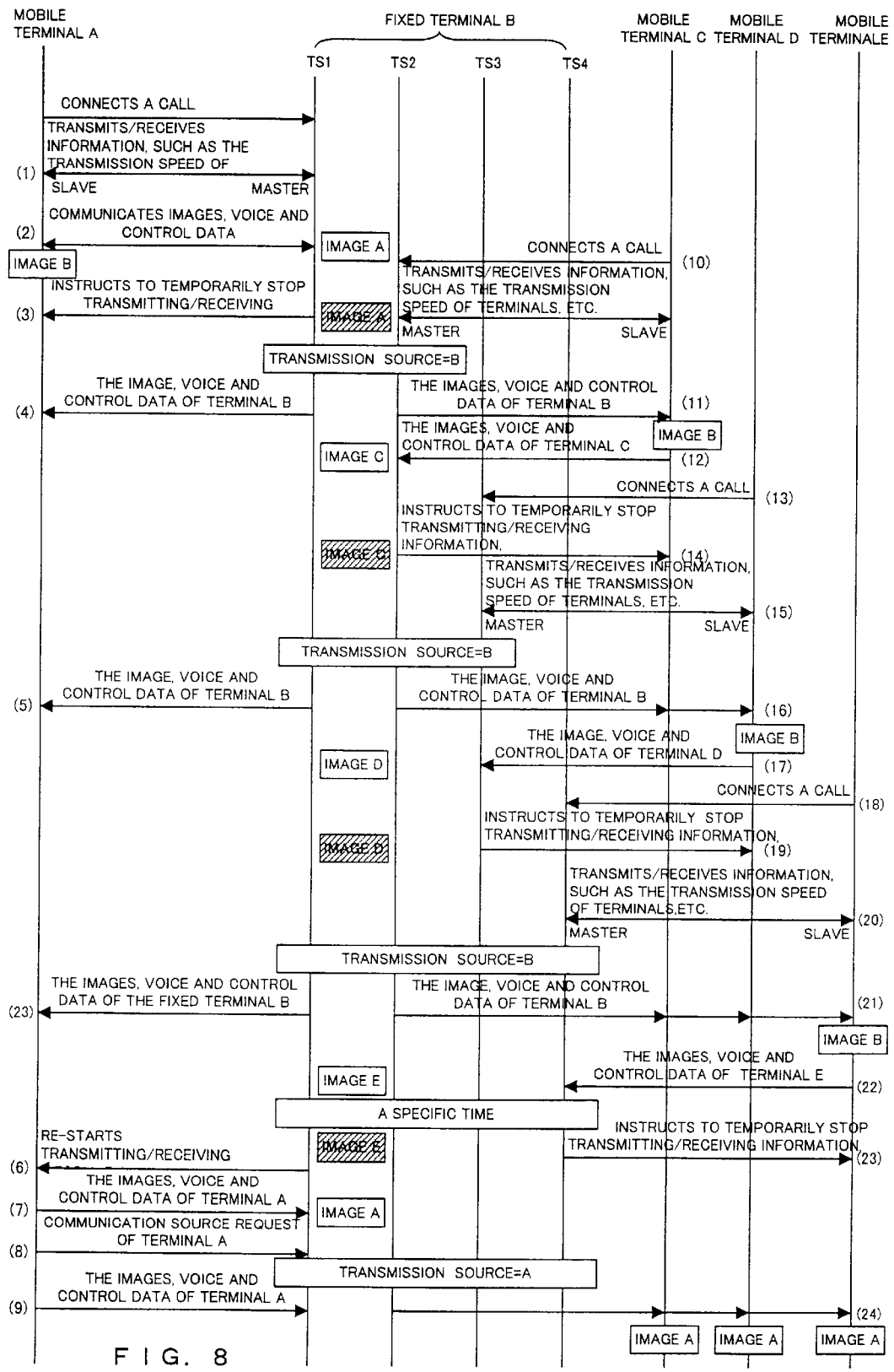
FIG. 8 is a sequence diagram showing a process in the case where more than two mobile terminals are accommodated.

FIG. 8 is a sequence diagram showing a process in the case where more than two mobile terminals are accommodated.

First, it is assumed that there is a call connection request in the channel 1 of a fixed terminal B from a mobile terminal A (1). Then, the mobile terminal A and fixed terminal B are connected and are set as a master and a slave, respectively. Then, images, voice and control data are transmitted/received between the mobile terminal A and fixed terminal B (2). Then, it is assumed that there is a call connection request in the channel 2 of the fixed terminal B from a mobile terminal C (10). Connection is established between the fixed terminal B and mobile terminal C, and the fixed terminal B issues an instruction to temporarily stop transmitting/receiving information to the mobile terminal A (3). At this time, the fixed terminal B sets its own terminal as the transmission source, and transmits the image, voice and control data of the fixed terminal B to both the mobile terminals A and C (4 and 11). In the meantime, the mobile terminal C transmits the images, voice and control data to the fixed terminal B (12). Further, it is assumed that there is a call connection request in the channel 3 of the terminal B from a mobile terminal D (13). Then, the fixed terminal B issues an instruction to temporarily stop the transmission/reception to/from the mobile terminal C (14) and simultaneously displays the images from the mobile terminal C in freeze-frame. Information, such as the transmission speed of the terminals, etc., is transmitted/received between the fixed terminal B and mobile terminal D, and connection is established between the fixed terminal B and mobile terminal D with the fixed terminal B and mobile terminal D set as a master and a slave, respectively (15). The fixed terminal B sets its own terminal as the transmission source, and the images, voice and control data are transmitted to the mobile terminals A, C and D (5, 16). The mobile terminal D transmits the images, voice and control data to the fixed terminal B (17). Furthermore, if it is assumed that there is a call connection request from a mobile terminal E via the channel 4 of the fixed terminal B (18), similarly, an instruction to temporarily stop transmitting/receiving information is transmitted from the fixed terminal B to the mobile terminal D (19). Information, such as the transmission speed of terminals, etc., is transmitted/received between the fixed terminal B and mobile terminal E, and connection is established between the fixed terminal B and mobile terminal E with the fixed terminal B and mobile terminal E set as a master and a slave, respectively (20). Then, the fixed terminal B sets its own terminal as the transmission source, and the image, voice and control data of the fixed terminal B are transmitted to the mobile terminals A, C, D and E (21 and 25). Then, the mobile terminal E transmits the images, voice and control data to the fixed terminal B (22). Then, after a specific time has elapsed, the fixed terminal B issues an instruction to temporarily stop transmitting/receiving information to the mobile terminal E (23) and issues an instruction to re-start transmitting/receiving information to the mobile terminal A which has been temporarily stopped initially (6). The images, voice and control data are transmitted from the mobile terminal A to the fixed terminal B. If the mobile terminal A issues a request to set the mobile terminal A as the transmission source to the fixed terminal B (8), the transmission source is set to the mobile terminal A. Then, the images, voice and control data transmitted by the mobile terminal A are also transmitted to the mobile terminals C, D and E (24). The fixed terminal B can obtain information from each mobile terminal by sequentially switching the connections established between the fixed terminal B and the mobile terminals A through E.

Figure 9:
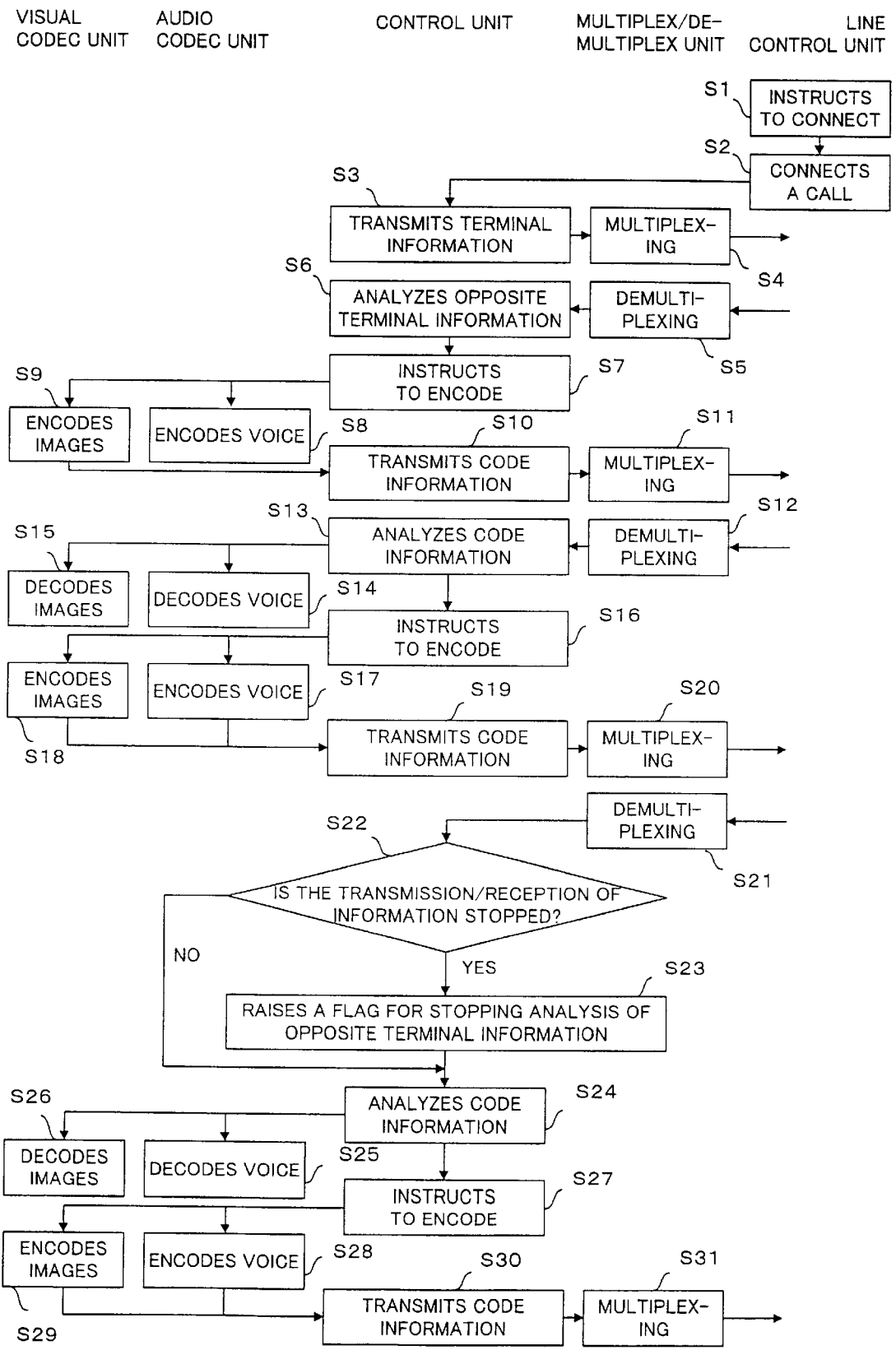
FIG. 9 is a flowchart showing a process performed by mobile terminals A, C, D and E (No. 1).
Figure 10:
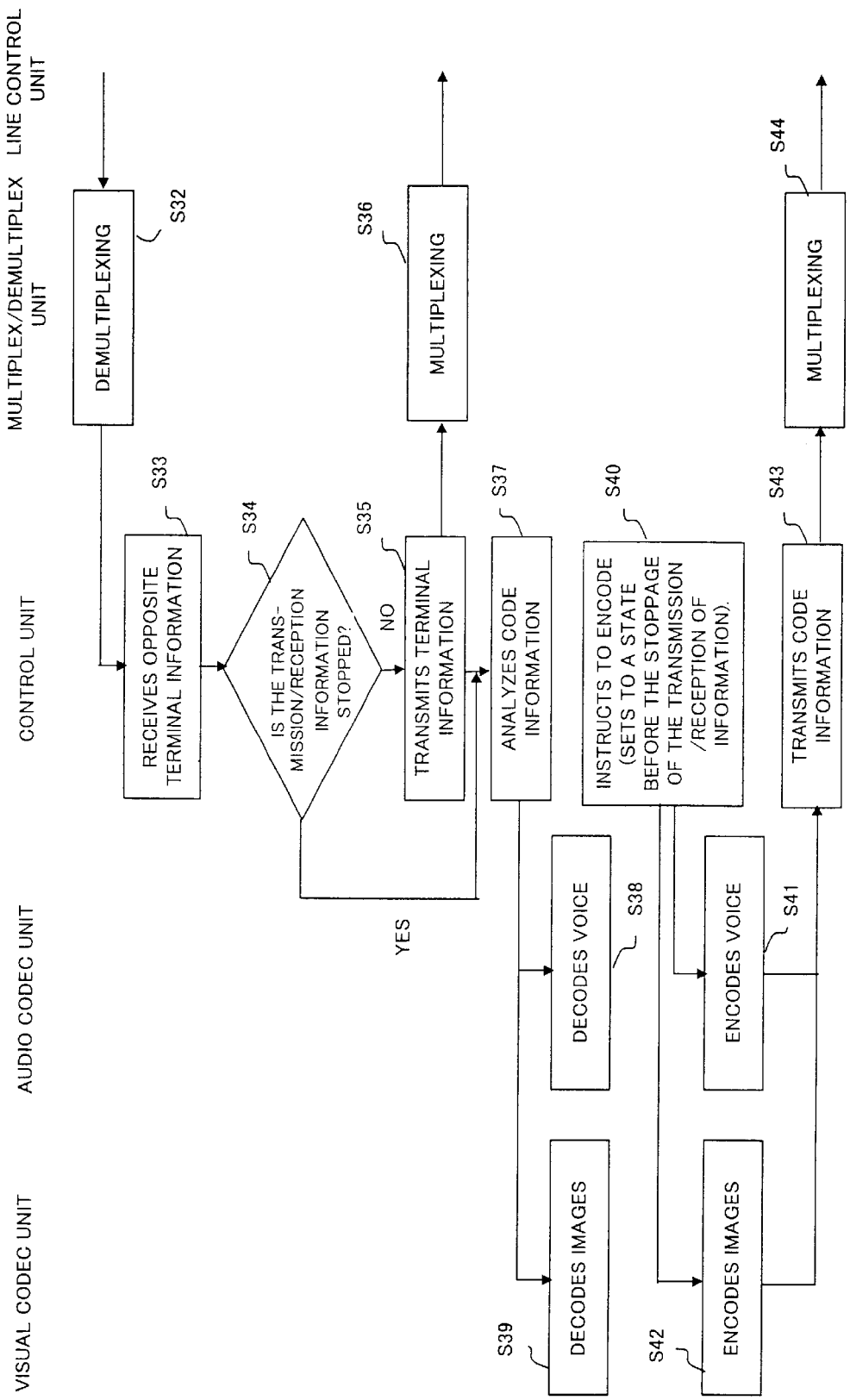
FIG. 10 is a flowchart showing a process performed by mobile terminals A, C, D and E (No. 2).

FIGS. 9 and 10 are flowcharts showing processes which are performed by the mobile terminals A, C, D and E.

First, in step Si, a user issues a connect instruction to a mobile terminal. Then, a call connection request is generated (step S2). The call connection request is processed for transmission in step S3, is multiplexed in step S4 and is transmitted to the fixed terminal B. Signals transmitted from the fixed terminal B are demultiplexed in step S5 and the information is analyzed in step S6. At this point, control data are extracted and in step S7, the encoding of the data, such as images obtained by its own terminal is instructed according to the control data. In steps S8 and S9, images and voice are encoded according to information included in the control data transmitted from the fixed terminal B. In step S10, the code information of the encoded images and voice are processed for transmission. At this time, control data are also generated. Then, in step S11, the encoded visual data, audio data and control data are multiplexed and are transmitted to the fixed terminal B. In this way, a line is established between the mobile terminal and fixed terminal B. When the line is established, the images, etc., are transmitted from the fixed terminal B. In step S12, signals including the encoded visual data, audio data and control data are demultiplexed; in step S13, the encoded data attached to the control data and transmitted are analyzed; and in step S16, the encoding of the data, such as images, etc., of its own terminal are instructed. Since the signals demultiplexed in step S12 also include visual signals and audio signals, in steps S14 and S15, the images and voice are decoded and are outputted to its own terminal. In steps S17 and S18, the images and voice obtained by its own terminal are encoded according to the encoding instruction in step S16; in step S19, the encoding information is processed for transmission; and in step S20, the images, voice and control data are multiplexed and are transmitted to the fixed terminal.

Then, if a signal is received from the fixed terminal B, in step S21, the signal is demultiplexed into visual data, audio data and control data; and in step S22, it is judged whether the signal instructs the stoppage of the transmission/reception of information. If it instructs the stoppage of the transmission/reception of information, in step S23, a flag for stopping the analysis of the opposite terminal information is raised and the flow proceeds to step S24. In this case, the flag for indicating analysis stoppage is provided with an address for stopping analysis stoppage in the work memory, and if information is transmitted from the opposite terminal, this flag is referenced. If in step S22, it is judged that it does not instruct the stoppage of the transmission/reception of information, the flow proceeds to step S24. Then, in step S24, the code information of the control data is analyzed and simultaneously the visual data and the audio data are transmitted to a visual codec and an audio codec, respectively, and are decoded (steps S25 and S26). In step S27, a control unit issues encode instructions to both the visual codec and audio codec based on the process result of the code information analysis (step S24). According to these instructions, in the visual codec and audio codec, the visual data and audio data, respectively, are encoded (steps S28 and S29) and the control unit processes the encoding information for transmission (step S30). Then, the control data are multiplexed to the visual data and audio data (step S31) and are transmitted to the fixed terminal B.

Then, in step S32, a signal from the fixed terminal B or another terminal is received and demultiplexed. In step S33, opposite terminal information included in the control data is received, the information analysis stop flag set previously is referenced and it is judged whether the transmission/reception of information, is stopped (step S34). If the transmission/reception of information is stopped, the terminal information of its terminal is transmitted as control data (step S35) and, simultaneously in step S36, visual data and audio data for transmission obtained by the encoding of both the visual data and audio data, which independently operate, are multiplexed and are transmitted to the fixed terminal B. In addition to this, after step S35, the flow proceeds to step S37 to process both the received visual data and audio data. In step S34, if it is not judged that it instructs the stoppage of information transmission /reception, the flow proceeds to step S37 without further operation. In step S37, the code information of the control data is analyzed, and in steps S38 and S39, the images and voice are decoded.

Steps S40 through S44 show the operation process of visual data and audio data performed when the transmission /reception of information is stopped. In step S40, encoding is instructed. At this time, since the transmission/reception of information is stopped, the encoded data of a new image cannot be obtained. Therefore, in this case, the encoding is instructed using the setting made immediately before the transmission/reception of information is stopped. In steps S41 and S42, the images and voice obtained by its own terminal are encoded and in step S43, the encoded data are processed for transmission. Then, in step S44, both the data and the control data generated in step S35 are multiplexed and transmitted. Although steps S36 and S44 are separately described in this flowchart, the steps are actually simultaneously performed in a multiplex/demultiplex unit for the reason of the relationship between the transmitting timing of the code information of images and voice and the transmitting timing of the terminal information of control data, and the terminal information generated in step S35 and the code information generated in step S43 are multiplexed and transmitted.

As described above, even if there is no direct transmission/reception of data between the mobile terminal and the fixed terminal B, data are one-sidedly transmitted from its own terminal and the communication session is held while the transmission/reception of information is stopped. Then, after that, steps S21 through S44 are repeated.

Figure 11:
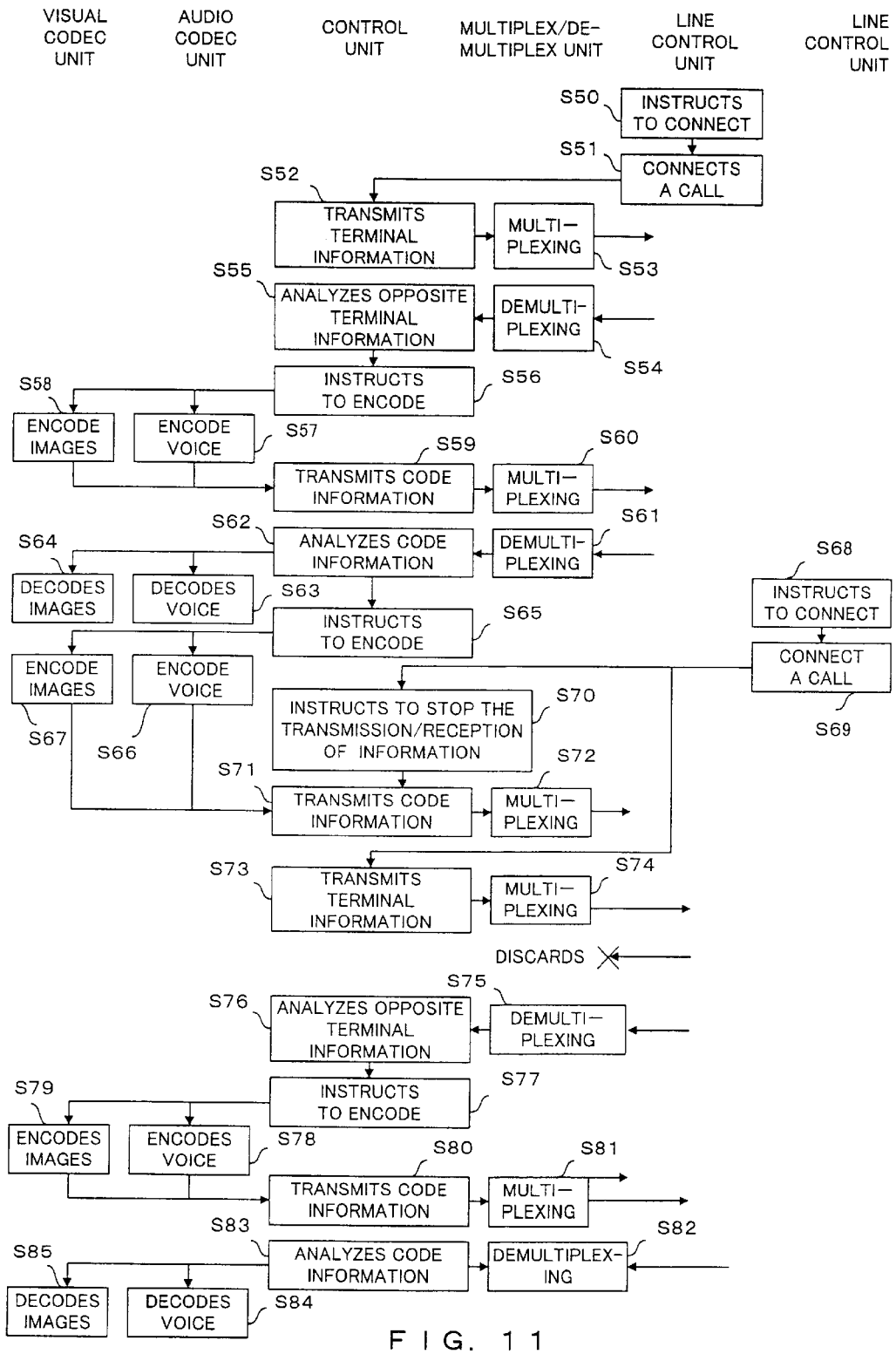
FIG. 11 is a sequence diagram showing the process of a terminal B, which is a master terminal.

FIG. 11 is a sequence diagram showing the process of the fixed terminal B, which is a master terminal.

First, if in step S50, a connect instruction is issued to channel 1, in step S51, a call connection request is generated. Then, in step S52, the terminal information is processed for transmission, is multiplexed to visual data, etc., and is transmitted to channel 1 (step S53).

When the signal from channel 1 is received at the fixed terminal B, in step S54, the signal is demultiplexed, the terminal information of an opposite interface is analyzed (step S55); and in step S56, an encode instruction is issued to both the visual codec and audio codec. In steps S57 and S58, the voice and images obtained at the fixed terminal B are encoded; in step S59, the code information is processed for transmission; and in step S60, and the code information is multiplexed to control information and is transmitted from channel 1. When a signal is further received from channel 1 at the fixed terminal B, in step S61, the signal is demultiplexed, the code information is analyzed (step S62) and the visual data and audio data are decoded (steps S63 and S64). The analysis result obtained in step S62 is forwarded to step S65 and is used in the encoding instruction process of the images and voice obtained at the fixed terminal B. Then, in steps S66 and S67, both the visual data and audio data are encoded and the flow proceeds to step S71. In this case, if in step S68 there is a connect instruction in channel 2, in step S69, a call connection request is generated. The request is forwarded to step S73, the terminal information is processed for transmission and is multiplexed to the images and voice of the fixed terminal B and is transmitted to channel 2 (step S74). For channel 1, in step S70, an instruction to temporarily stop transmitting/receiving information is generated; in step S71, the code information is processed for transmission; and in step S72, the code information is multiplexed to the visual data and audio data and is transmitted to channel 1. After this, signals from channel 1 are discarded.

When the signal is further received from channel 2 at the fixed terminal B, in step S75, the signal is demultiplexed and opposite terminal information is analyzed (step S76). Then, in step S77, encode instructions are issued to both the visual codec and. audio codec based on the analysis result, the images and voice are encoded (steps S78 and S79), and in step S80, the code information is processed for transmission. In step S81, the processed images, voice and control data are multiplexed and are transmitted to both channels 1 and 2. When a signal from channel 2 is received at the fixed terminal B, in step S82, the signal is demultiplexed, the code information is analyzed (step S83) and the visual data and audio data are decoded (steps S85 and S86). The processes in step S83 and after are the same as the processes in steps S65 through S74. In this case, if there is no connect instruction from another channel (a channel other than channels 1 and 2), the processes in steps S65 through S74 are the same as those in steps S75 through S81.

Figure 12:
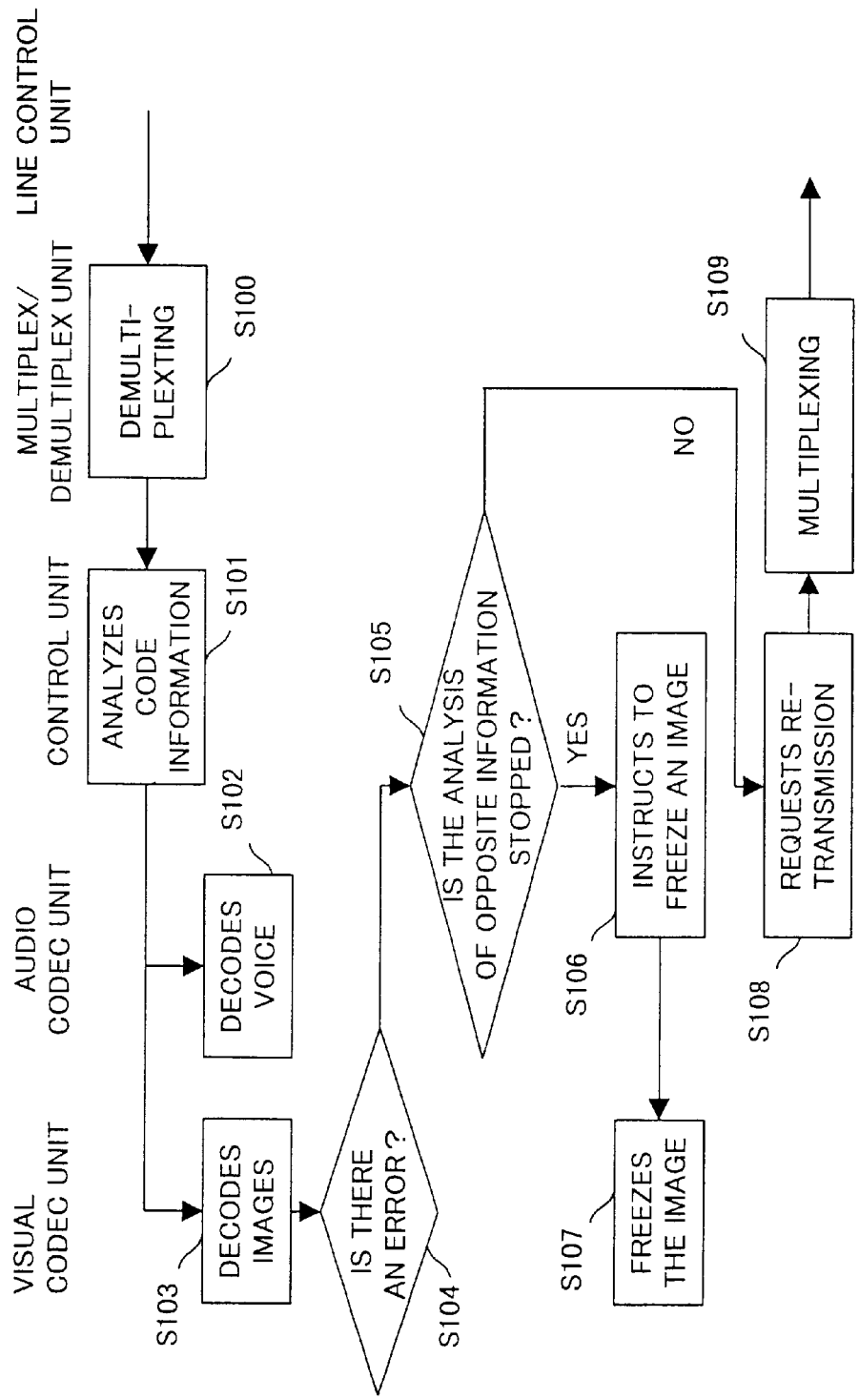
FIG. 12 is a flowchart showing a process performed by mobile terminals A, C, D and E in the case where there is an error in which a transmitted image is destroyed (No. 1).
Figure 13:
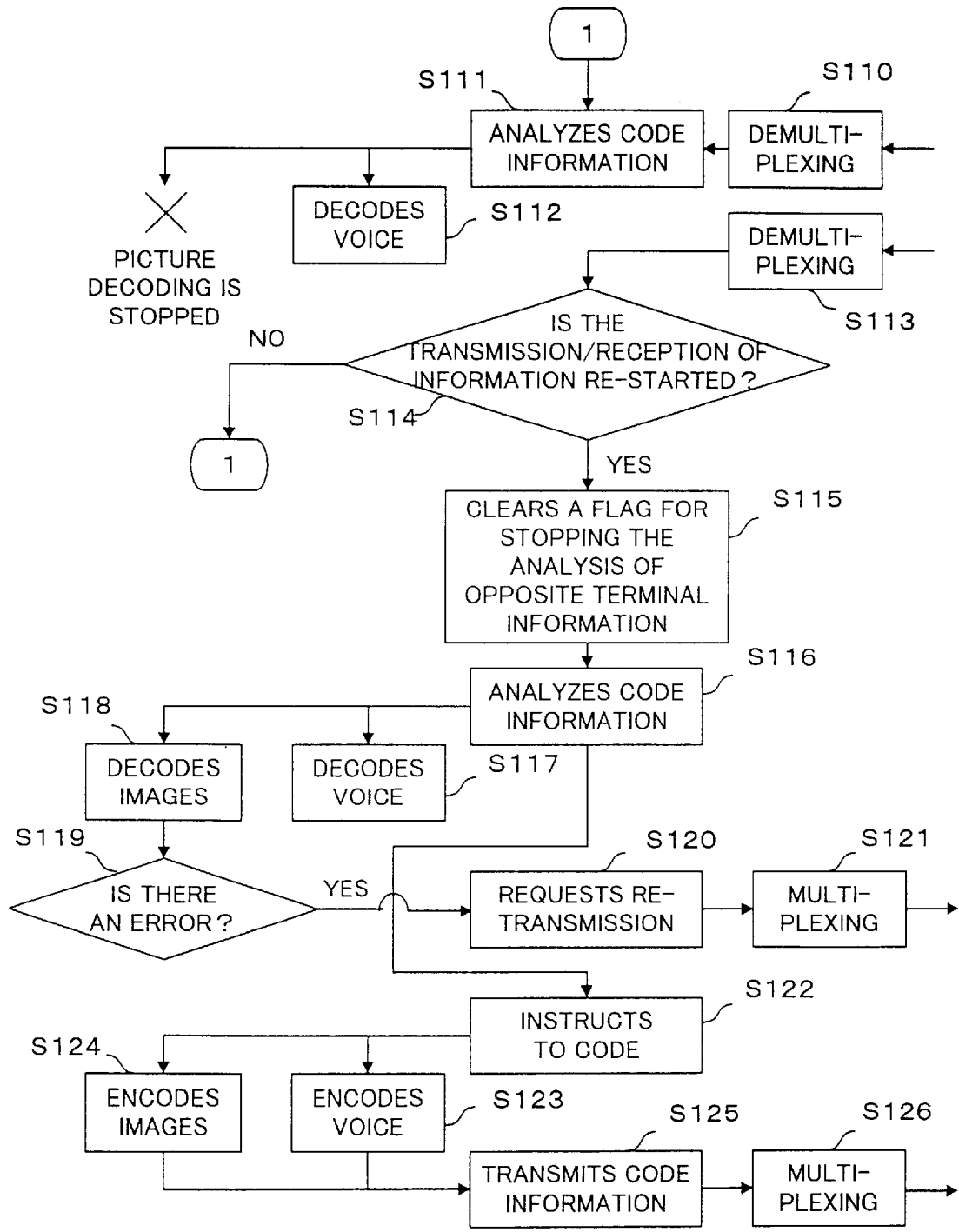
FIG. 13 is a flowchart showing a process performed by terminals A, C, D and E in the case where there is an error in which a transmitted image is destroyed (No. 2).

FIGS. 12 and 13 are flowcharts showing the process performed by mobile terminals A, C, D and E in the case where there is an error in which transmitted images are destroyed, etc.

First, in step S100, a signal is received and demultiplexed. Then, in step S101, the code information is analyzed; and in steps S102 and S103, the images and voice are decoded. In this case, it is assumed that there is an error in an image. Then, in step S104, the error of the image is detected; and in step S105, it is judged whether a flag for indicating the stoppage of the analysis of the opposite information is raised. If the flag is not raised, in step S108, a re-send request is generated; and in step S108, the request is multiplexed to other data and is transmitted. If in step S105, the flag is raised, in step S106, an image freeze instruction is generated and the image is displayed in freeze-frame in the visual codec unit (step S107).

When a signal is further received at the fixed terminal, in step S110, the signal is demultiplexed, the code information is analyzed (step S111) and the voice is decoded (step S112). At this time, image decoding is temporarily stopped. In the meantime, the signal is received and demultiplexed (step S113) and, in step S114, it is judged whether the transmission/reception of information is re-started. If the transmission/reception of information is not re-started, the flow returns to step S111. If in step. S114, the transmission/reception of information is re-started, in step S115, a flag for stopping the analysis of the opposite terminal information is cleared and in step S116, the code information is analyzed. Then, the images and voice are decoded (steps S117 and S118) and, in step S117, it is judged whether there is any error in an image. If there is no error, the image is simply displayed. However, if there is any error, in step S120, a re-start request is generated, is multiplexed to another signal (step S121) and is transmitted. The analysis result of the code information obtained in step S116 is used for the generation of an encode instruction in step S122 and in steps S123 and S124, is used to encode the voice and images. Then, in step S125, the code information of the encoded signals is processed for transmission; in step S126, is multiplexed to control data and is transmitted.

As described above, visual communications by a conventional mobile object are peer-to-peer communications or one-directional multi-address communications conducted from one terminal to a plurality of terminals like a broadcast system compared with the present invention. Information must be transmitted/received in both directions between a plurality of points, such as disaster site points, office and construction site points, etc., and that such a system must be configured at a low cost. According to the present invention, information can be transmitted/received in real time between a plurality of points using terminals for peer-to-peer communications which meet the above-described requirements.

Although the present invention is described above using a specific preferred embodiment, a variety of variations are also available. For example, the number of mobile terminals is not limited to two or four.

According to the present invention, multi-point communications can be implemented using simple and inexpensive devices, and data obtained by mobile terminals can be transmitted/received between the terminals in real time.

What is claimed is:

1. A multi-point communications system, comprising:
at least two slave terminal units acquiring information, transmitting the information over a radio network and temporarily stopping transmitting/receiving the information while holding their communications sessions, if required; and
a master terminal unit including at least one received information interpreting unit and having more channels than the number of the slave terminal units but having fewer received information interpreting units than the number of channels to be accommodated by the master terminal unit, the master terminal unit temporarily stopping transmitting/receiving information while allowing one or more slave terminal units currently connected to a radio network to hold their communication sessions if there is a new connect request from another unconnected slave terminal unit out of the at least two slave terminal units while being connected to one or more out of the at least two slave terminal units, and connecting to the network the slave terminal unit which requests a new connection.

2. The multi-point communications system according to claim 1, wherein said at least one received information interpreting unit receives information from a plurality of slave terminal units by time division multiplexing and relays the received information to other slave terminal units.

3. The multi-point communications system according to claim 1, wherein said at least one received information interpreting unit of said master terminal unit is provided with one set of a data encoding/decoding unit and a data multiplex/demultiplex unit.

4. The multi-point communications system according to claim 2, wherein information from an arbitrary slave terminal unit or the master terminal unit is available at other slave terminal units and the master terminal unit by designating a transmission source of information.

5. The multi-point communications system according to claim 1, wherein said master terminal unit accommodates said slave terminal units with different transmission speeds, modifies information transfer speed according to a transmission speed of each slave terminal unit and transmits information to each slave terminal unit.

6. The multi-point communications system according to claim 1, wherein the received information in said at least one received information unit consists of visual data, audio data and control data.

7. A multi-point communications method for implementing multi-point communications among at least two terminal units in which information, which can be transmitted over a radio network and a transmission/reception of the information can be temporarily stopped while its communication session is held, can be acquired via a master terminal unit including at least one received information interpreting unit which accommodates more channels than the number of the slave terminal units and has fewer received information interpreting units than the number of channels to be accommodated by the master terminal unit, the method comprising the steps of:

temporarily stopping transmitting/receiving information while allowing slave terminal units currently connected to a radio network to hold their communication sessions if there is a new connect request from an unconnected slave terminal out of the at least two slave terminal units while the master terminal unit is connected to one or more slave terminal units out of the at least two slave terminal units; and connecting to the network the slave terminal unit which requests a new connection.

8. The multi-point communications method according to claim 7, wherein the received information interpreting unit of said master terminal unit receives information from a plurality of slave terminal units by time division and relays received information to other slave terminal units.

9. The multi-point communications method according to claim 7, wherein said at least one received information interpreting unit of said master terminal unit is provided with one set of a data encoding/decoding unit and a data multiplex/demultiplex unit.

10. The multi-point communications method according to claim 8, wherein information from an arbitrary slave terminal unit or the master terminal unit is available at other slave terminal units and the master terminal unit by designating a transmission source of information.

11. The multi-point communications method according to claim 7, wherein said master terminal unit accommodates said slave terminal units with different transmission speeds, modifies information transfer speed according to a transmission speed of each slave terminal unit and transmits information to each slave terminal unit.

12. The multi-point communications method according to claim 7, wherein the received information in said at least one received information interpreting unit consists of visual data, audio data and control data.

* * * * *